(12) United States Patent
Georgin (10) Patent No.: US 12,291,183 B2
(45) Date of Patent: May 6, 2025

(54) ADVANCED LOCKED WHEEL PROTECTION FUNCTIONALITY

(71) Applicant: Goodrich Corporation, Charlotte, NC (US)

(72) Inventor: Marc J Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 279 days.

(21) Appl. No.: 17/974,350

(22) Filed: Oct. 26, 2022

(65) Prior Publication Data
US 2024/0140377 A1 May 2, 2024

(51) Int. Cl.
B60T 8/1761 (2006.01)
B60T 8/17 (2006.01)
B64C 25/42 (2006.01)

(52) U.S. Cl.
CPC ........ B60T 8/17616 (2013.01); B60T 8/1703 (2013.01); B64C 25/42 (2013.01); *B60T 2240/00* (2013.01); *B60T 2270/10* (2013.01)

(58) Field of Classification Search
None
See application file for complete search history.

(56) References Cited

U.S. PATENT DOCUMENTS

| | | |
|---|---|---|
| 3,847,445 A | 11/1974 | Bissell et al. |
| 3,880,475 A | 4/1975 | Booher |
| 4,120,540 A | 10/1978 | Devlieg |
| 6,325,469 B1 * | 12/2001 | Carson ............ B60T 8/1755 303/146 |
| 6,547,343 B1 * | 4/2003 | Hac ............ B60T 8/1755 303/146 |
| 6,918,638 B2 * | 7/2005 | Schneider ............ B60T 8/1755 303/140 |
| 10,189,476 B1 * | 1/2019 | Edren ............ B60L 15/2036 |
| 10,703,464 B2 | 7/2020 | Georgin et al. |
| 2003/0111895 A1 | 6/2003 | Salamat et al. |
| 2006/0055234 A1 | 3/2006 | Choi et al. |
| 2010/0102173 A1 * | 4/2010 | Everett ............ B60T 8/1755 244/175 |

(Continued)

FOREIGN PATENT DOCUMENTS

| | | |
|---|---|---|
| CN | 202244077 | 5/2012 |
| WO | 9526287 | 10/1995 |

OTHER PUBLICATIONS

European Patent Office, European Search Report dated Mar. 1, 2024 in Application No. 23205748.9.

*Primary Examiner* — James J Lee
*Assistant Examiner* — David Hatch
(74) *Attorney, Agent, or Firm* — SNELL & WILMER L.L.P.

(57) ABSTRACT

A method for controlling brake assemblies of a vehicle is provided. Responsive to identifying a locked wheel protection event for a first wheel of a paired set of wheels on the vehicle, where the paired set of wheels is the first wheel on one side of the vehicle and a second wheel on an opposite side of the vehicle, a first brake pressure to a first brake assembly associated with the first wheel is released to zero pounds per square inch (PSI) and a second brake pressure to a second brake assembly associated with the second wheel of the paired set of wheels is reduced by a predetermined amount thereby reducing a yaw effect to the vehicle.

18 Claims, 7 Drawing Sheets

(56) References Cited

U.S. PATENT DOCUMENTS

| | | |
|---|---|---|
| 2019/0193708 A1 | 6/2019 | Kordik et al. |
| 2020/0017202 A1 | 1/2020 | Georgin et al. |
| 2021/0276519 A1 | 9/2021 | Georgin |

* cited by examiner

ADVANCED LOCKED WHEEL PROTECTION FUNCTIONALITY

FIELD

The present disclosure generally relates to the field of aircraft and, more particularly, to control of aircraft braking systems using advanced locked wheel protection functionality.

BACKGROUND

Locked wheel protection (LWP) is an important part of hydroplaning control for aircraft brake control system. Locked wheel protection compares the wheel speed of two or more wheels and, if one of the wheels is too slow, locked wheel protection releases the brake pressure on the slow wheel.

SUMMARY

According to various embodiments of the present disclosure, a method for controlling brake assemblies of a vehicle is provided. The method includes, responsive to identifying a locked wheel protection event for a first wheel of a paired set of wheels on the vehicle, where the paired set of wheels is the first wheel on one side of the vehicle and a second wheel on an opposite side of the vehicle: reducing a first brake pressure to a first brake assembly associated with the first wheel to zero pounds per square inch (PSI); and reducing a second brake pressure to a second brake assembly associated with the second wheel of the paired set of wheels by a predetermined amount thereby reducing a yaw effect to the vehicle.

In various embodiments, the predetermined amount is from 40% to 60% of a brake pressure being commanded by a brake pedal of the vehicle. In various embodiments, the method further reduces the second brake pressure to the second brake assembly associated with the second wheel linearly over a predetermined time period. In various embodiments, the predetermined time period is from 1 to 6 seconds.

In various embodiments, the method further determines whether the first wheel has recovered from the locked wheel protection event; and, responsive to the first wheel recovering from the locked wheel protection event, returns the first brake pressure and the second brake pressure to a braking pressure being commanded by a brake pedal of the vehicle. In various embodiments, the determination of whether the first wheel has recovered from the locked wheel protection event occurs over a predetermined time period.

In various embodiments, responsive to the predetermined time period expiring and the first wheel failing to recover from the locked wheel protection event, the method leaves the first brake pressure at zero PSI and returns the second brake pressure to a braking pressure being commanded by a brake pedal of the vehicle. In various embodiments, the locked wheel protection event is indicated by a wheel speed transducer indicating a wheel speed of substantially zero.

Also disclose herein is a system for controlling brake assemblies of a vehicle. The system includes: a brake control unit, where the brake control unit is configured to: responsive to identifying a locked wheel protection event for a first wheel of a paired set of wheels on the vehicle, where the paired set of wheels is the first wheel on one side of the vehicle and a second wheel on an opposite side of the vehicle: reduce a first brake pressure to a first brake assembly associated with the first wheel to zero pounds per square inch (PSI); and reduce a second brake pressure to a second brake assembly associated with the second wheel of the paired set of wheels by a predetermined amount thereby reducing a yaw effect to the vehicle.

In various embodiments, the predetermined amount is from 40% to 60% of a brake pressure being commanded by a brake pedal of the vehicle. In various embodiments, the brake control unit is further configured to: further reduce the second brake pressure to the second brake assembly associated with the second wheel linearly over a predetermined time period. In various embodiments, the predetermined time period is from 1 to 6 seconds.

In various embodiments, the brake control unit is further configured to: determine whether the first wheel has recovered from the locked wheel protection event; and, responsive to the first wheel recovering from the locked wheel protection event, return the first brake pressure and the second brake pressure to a braking pressure being commanded by a brake pedal of the vehicle. In various embodiments, the determination of whether the first wheel has recovered from the locked wheel protection event occurs over a predetermined time period.

In various embodiments, the brake control unit is further configured to: responsive to the predetermined time period expiring and the first wheel failing to recover from the locked wheel protection event, leave the first brake pressure at zero PSI and return the second brake pressure to a braking pressure being commanded by a brake pedal of the vehicle. In various embodiments, the locked wheel protection event is indicated by a wheel speed transducer indicating a wheel speed of substantially zero.

Also disclose herein is an aircraft. The aircraft includes: a first wheel and a second wheel; a first brake assembly associated with a first wheel; a second brake assembly associated with a second wheel; and a brake control unit, where the brake control unit is configured to: responsive to identifying a locked wheel protection event for the first wheel: reduce a first brake pressure to the first brake assembly to zero pounds per square inch (PSI); and reduce a second brake pressure to the second brake assembly by a predetermined amount thereby reducing a yaw effect to the aircraft.

In various embodiments, the brake control unit is further configured to: further reduce the second brake pressure to the second brake assembly associated with the second wheel linearly over a predetermined time period. In various embodiments, the brake control unit is further configured to: determine whether the first wheel has recovered from the locked wheel protection event; and, responsive to the first wheel recovering from the locked wheel protection event, return the first brake pressure and the second brake pressure to a braking pressure being commanded by a brake pedal of the vehicle, wherein the determination of whether the first wheel has recovered from the locked wheel protection event occurs over a predetermined time period.

In various embodiments, the brake control unit is further configured to: responsive to the predetermined time period expiring and the first wheel failing to recover from the locked wheel protection event, leave the first brake pressure at zero PSI and return the second brake pressure to a braking pressure being commanded by a brake pedal of the aircraft.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Locked wheel protection (LWP) is an important part of hydroplaning control for brake control system on a vehicle, such as an automobile or aircraft, among others. On an aircraft, the LWP function activates when bad runway conditions require an immediate release of brake pressure (hydraulic systems) or brake clamping force (electrical systems). For example, when hydroplaning of a wheel occurs due to over watered runway conditions or a runway surface of compromised integrity. Hereinafter, the description and examples are directed to pressure but it is recognized that the same operation may be applied with regard to electrical systems and the force applied by those systems. The LWP compares the wheel speed of two or more wheels and, if one of the wheels is too slow, locked wheel protection releases the brake pressure on the slow wheel. The LWP function releases brake pressure, i.e., reduces the brake pressure to zero pounds per square inch (PSI), to help the wheel recover from an imminent locked wheel condition that a hydroplaning system on the aircraft is unable control. The abrupt release of brake pressure may have a severe effect on the yaw of the aircraft. On a 4-wheeled aircraft, the net effect of the release of the brake pressure may cause of loss of up to 50% of the braking force on a landing gear and, therefore, induce a potential significant yaw of the aircraft. This may cause difficulty for the pilot who may need to quickly react and intervene to maintain the aircraft in a straight-line during landing or other intense braking event.

Therefore, disclosed herein are methods and systems to control of aircraft braking systems using advanced locked wheel protection functionality. For example, in an aircraft that has four wheels and thus, four brakes, a left outboard (OB) wheel/brake is a symmetric pair with a right OB wheel/brake and the left inboard (IB) wheel/brake is a symmetric pair of the right IB wheel/brake. In various embodiments, the term "symmetric" indicates that symmetry occurs between the associated braking systems to make the braking system behave reasonably, i.e., to have balanced braking on both sides of the aircraft in order to reduce any yaw effects on the aircraft. According to methods and systems disclosed herein, in an event where the left IB wheel enters into LWP, the left IB brake pressure is immediately released to 0 pounds per square inch (PSI) and the right IB brake pressure is immediately reduced by an initial pressure percentage that is tunable. In various embodiments, the right IB brake pressure may initially be reduced by 40 to 60% of a brake pressure being commanded by a brake pedal of the vehicle. More particularly, the right IB brake pressure may initially be reduced by 45 to 55% of a brake pressure being commanded by a brake pedal of the vehicle. Preferably, the right IB brake pressure may initially be reduced by 50% of a brake pressure being commanded by a brake pedal of the vehicle. Responsive to the initial reduction in applied brake pressure to the right IB, for the associated brake system, the right IB brake pressure is further reduced linearly at a predetermined percentage of a brake pressure being commanded by a brake pedal of the vehicle for a predetermined time period. The predetermined time period may be from 1 to 6 seconds. More particularly, the predetermined time period may be from 3 to 5 seconds. Preferably, the predetermined time period is 4 seconds. By reducing the applied right IB pressure through the initial reduction and then the linear reduction, braking forces may be balanced across the landing gears, which decreases a yaw effect on the aircraft. While the LWP is active, an Aeronautical Radio, Incorporated (ARINC) message may be reported to a device in the cockpit for viewing by the pilot to indicate that the system is attempting to compensate for induced yaw.

During the predetermined time period, a determination is made as to whether the left IB wheel has recovered to a predetermined speed threshold. If during the predetermined time period the left IB wheel has recovered to the predetermined speed threshold, then the brake pressures are returned to both the left brake assembly and the right brake assembly at the pressure being commanded by the brake pedal. However, if during the predetermined time period the left IB wheel fails to recover to the predetermined speed threshold, then the brake pressure to the left IB brake assembly is left at zero PSI and the brake pressure to the right IB brake assembly resumes normally. Accordingly, the methods and systems described herein improve the LWP functionality to provide better stability control of the aircraft during landing or other intense braking event. The methods and systems minimize the induced yaw caused by the LWP function by pairing adequately symmetric wheels and providing feedback to the cockpit to inform the pilot of the situation.

Figure 1:
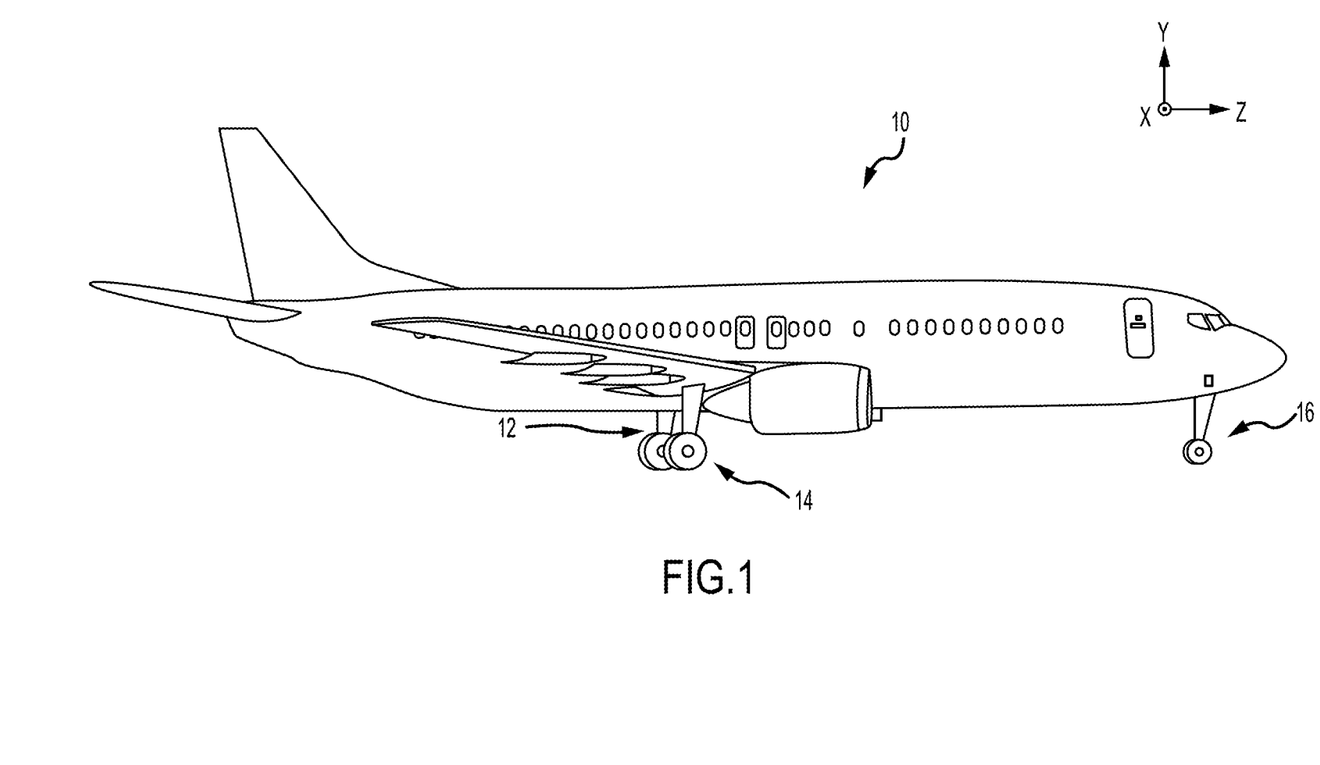
FIG. 1 illustrates an aircraft, in accordance with various embodiments.

Referring now to FIG. 1, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 2:
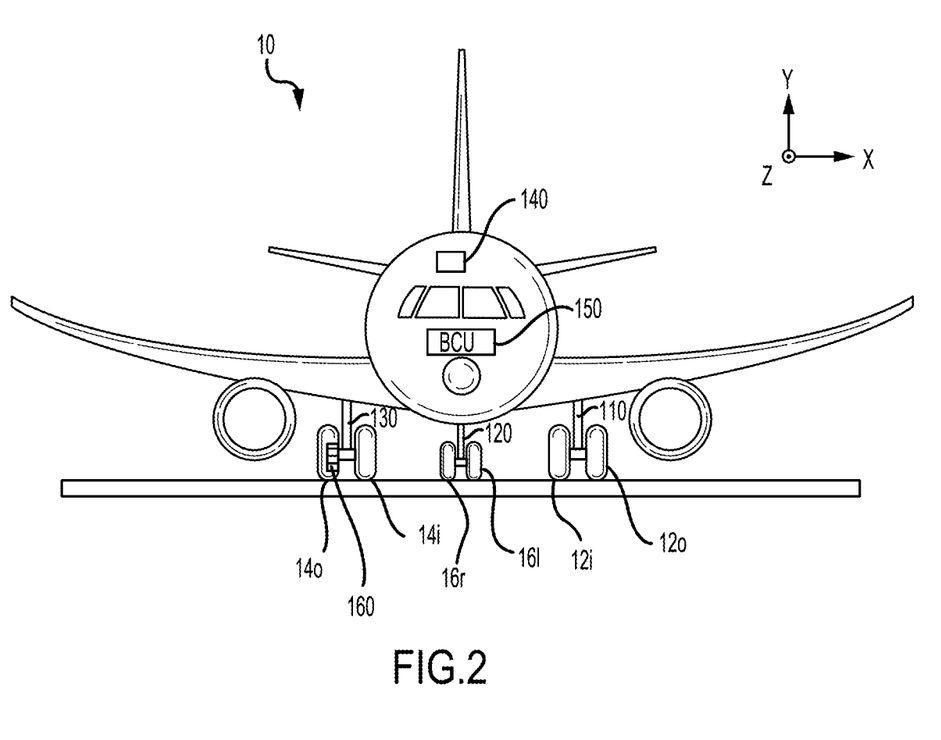
FIG. 2 illustrates an aircraft including multiple landing gear systems, in accordance with various embodiments.

Turning now to FIG. 2, in accordance with various embodiments, an aircraft 100 includes multiple landing gear systems, including a first landing gear 110, second landing gear 120, and third landing gear 130 is illustrated. The first landing gear 110, second landing gear 120, and third landing gear 130 each include one or more wheel assemblies. In various embodiments, the second landing gear 120, which is also a nose landing gear for the aircraft 100, includes a left wheel assembly 16l and a right wheel assembly 16r. In various embodiments, the first landing gear 110 includes an inboard wheel assembly 12i and an outer wheel assembly 12o, and the third landing gear 130 includes an inner wheel assembly 14i and an outer wheel assembly 14o. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and often times, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general-purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

In various embodiments, the aircraft 100 further includes one or more brakes coupled to each wheel assembly. For example, a brake 160 is coupled to the outer wheel assembly 14o of the third landing gear 130 of the aircraft 100. In operation, the brake 160 applies a braking force to the outer wheel assembly 14o upon receiving a brake command, such as from the BCU 150. In various embodiments, the outer wheel assembly 14o of the third landing gear 130 of the aircraft 100 includes any number of wheels.

Figure 3:
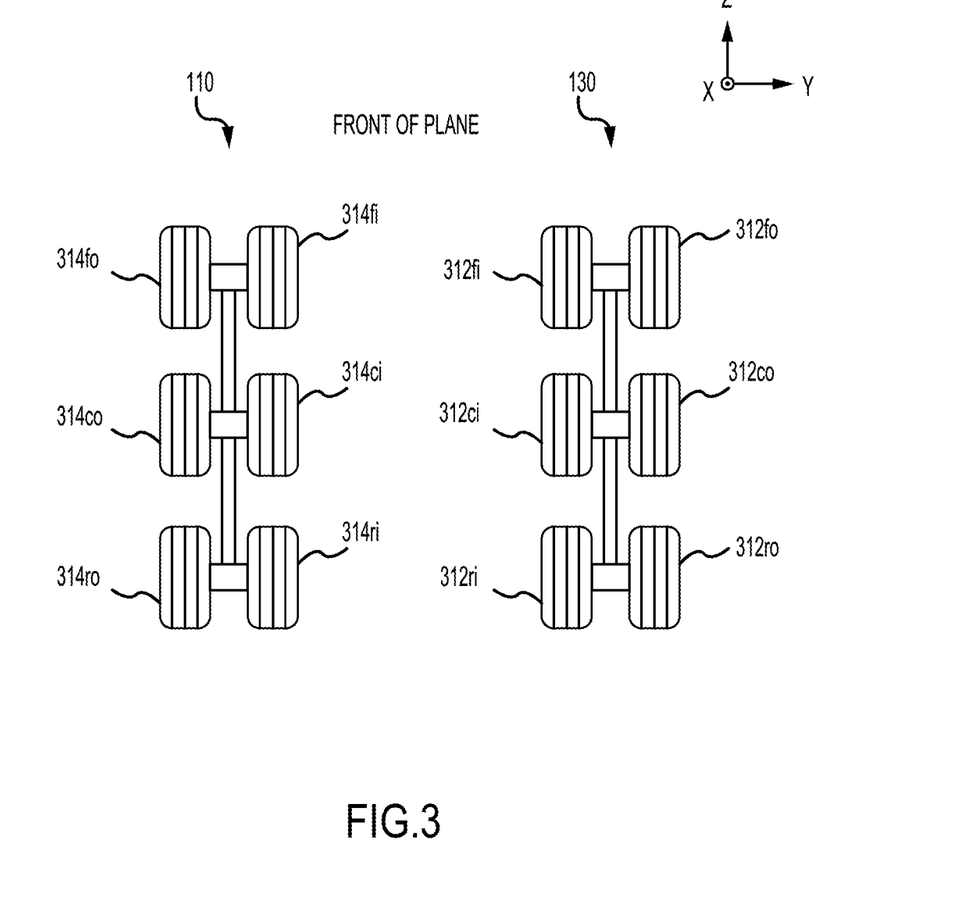
FIG. 3 illustrates a top view of landing gears with a plurality of a wheel sets, in accordance with various embodiments.

Turning now to FIG. 3, in accordance with various embodiments, a top view of landing gears with a plurality of a wheel sets is illustrated. That is, in various embodiments, landing gears, such as first landing gear 110 and third landing gear 130, may having multiple sets of wheels, referred to as a truck or a bogie. For example, there may be two sets of wheels, i.e., four wheels on the first landing gear 110 and four wheels on the third landing gear 130, or, as illustrated, three sets of wheels, i.e., six wheels on the first landing gear 110 and six wheels on the third landing gear 130. In various embodiments, the wheels are symmetrically controlled based on the wheel's position, i.e., which row (in a z-direction) and whether the wheel is inboard or outboard. Therefore, in FIG. 3, front wheel assembly 312fi is symmetric with front wheel assembly 314fi, front wheel assembly 312fo is symmetric with front wheel assembly 314fo, center wheel assembly 312ci is symmetric with center wheel assembly 314ci, center wheel assembly 312co is symmetric with center wheel assembly 314co, rear wheel assembly 312ri is symmetric with rear wheel assembly 314ri, and rear wheel assembly 312ro is symmetric with rear wheel assembly 314ro.

Figure 4:
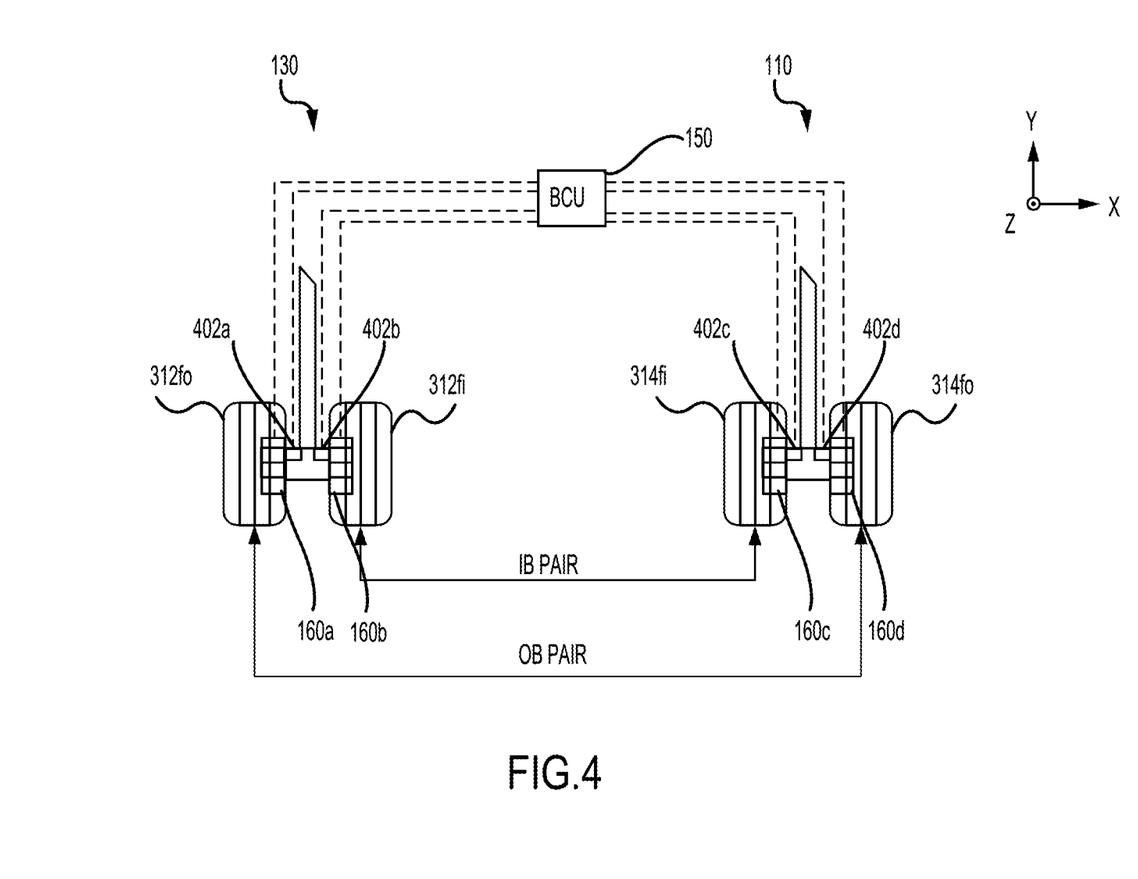
FIG. 4 illustrates a front view of landing gears with a plurality of a wheel sets, in accordance with various embodiments.

Turning now to FIG. 4, in accordance with various embodiments, a front view of landing gears with a plurality of a wheel sets is illustrated. In this illustration, only the front wheel assemblies 312fo, 312fi, 314fi, and 314fo are depicted. However, the operations described hereafter with regard to the front wheel assemblies 312fo, 312fi, 314fi, and 314fo operates similarly with regard to the center wheel assemblies 312co, 312ci, 314ci, and 314co and the rear wheel assemblies 312ro, 312ri, 314ri, and 314ro.

In various embodiments, each of front wheel assemblies 312fo, 312fi, 314fi, and 314fo comprises a brake assembly 160a, 160b, 160c, or 160d, respectively and a wheel speed transducer 402a, 402b, 402c, or 402d, respectively. In various embodiments, each of the wheel speed transducers 402a, 402b, 402c, and 402d, which may also be referred to as a wheel speed sensor, measures a rotation of its associated wheel. In various embodiments, responsive to the aircraft landing, the brake control unit (BCU) 150 receives an indication of wheel speed from each of the wheel speed transducers 402a, 402b, 402c, and 402d. Based on the detected wheel speed, the BCU 150 may determine whether a wheel is starting to lock up during braking commanded by the brake pedal. In an event, such as the entire runway being coated in water due to rain, responsive to a wheel starting to lock up, an anti-skid feature in the BCU 150 modulates the pressure to the brake to avoid the wheel from locking up.

However, in an event where only a portion of the runway may cause a wheel lock, such as a pothole or ice patch, among others, locked wheel events may occur that is too much for anti-skid feature to control. In such events, the BCU 150 utilizes a locked wheel protection function that oversees aircraft braking even above the anti-skid function. Accordingly, in an event where a wheel locks up, i.e., the wheel speed detected by the associated one of the wheel speed transducers 402a, 402b, 402c, or 402d is substantially zero, and the anti-skid function is not capable of releasing the braking pressure quickly, the locked wheel protection functionality takes over. In various embodiments, the term "substantially" may refer to an amount that is within 10% of, within 5% of, within 1% of, within 0.1% of, and within 0.01% of a stated amount or value. At a point where the wheel speed is detected as substantially zero, the locked wheel protection functionality takes over which causes the BCU 150 to release all pressure on the brake associated with the wheel to help the wheel recover. By releasing all the brake pressure to the wheel, the wheel is allowed to spin and return to a wheel speed associated with the speed of the aircraft.

With reference to FIG. 4, during landing or another intense braking event, a locked wheel event may occur, for example, due to the runway conditions discussed herein. If, for example, during such an event front wheel assembly 314fi locks up, wheel speed transducer 402c detects the wheel speed as substantially equal to zero. Because of the detected wheel speed of substantially zero, the BCU 150 enters LWP and releases the brake pressure to brake assembly 160c. Under known LWP control, the brake pressure release to brake assembly 160c may result in the braking on the aircraft causing a yaw effect to the aircraft. This is because there are two brakes, brake assemblies 160a and 160b, braking on the right side of the aircraft and only one brake, brake assembly 160d, braking on the left side of the aircraft, which may cause the aircraft to experience a yaw effect and veer to the right. In various embodiments, in order to counteract possible yaw effects to the aircraft, responsive to an event occurring such that, for example, front wheel assembly 314fi locks up such that the wheel speed transducer 402c detects the wheel speed as substantially zero and the BCU 150 releases the brake pressure to brake assembly 160c to zero PSI. In various embodiments, upon detecting the event, the BCU 150 initially reduces the brake pressure to the associated "paired" or symmetric brake, i.e., brake assembly 160b, by an initial pressure percentage that is tunable. In various embodiments, the brake pressure of the paired or symmetric brake, may initially be reduced by 40 to 60% of a brake pressure being commanded by a brake pedal of the vehicle. More particularly, the brake pressure may initially be reduced by 45 to 55% of a brake pressure being commanded by a brake pedal of the vehicle. In further embodiments, the brake pressure may initially be reduced by 50% of a brake pressure being commanded by a brake pedal of the vehicle.

In various embodiments, responsive to the initial reduction in applied brake pressure to brake assembly 160b, the brake pressure to brake assembly 160b is further reduced linearly at a predetermined percentage of a brake pressure being commanded by a brake pedal of the vehicle for a predetermined time period. In various embodiments, the predetermined time period may be from 1 to 6 seconds. More particularly, in various embodiments, the predetermined time period may be from 3 to 5 seconds. Preferably, in various embodiments, the predetermined time period is 4 seconds. By reducing the applied brake pressure to brake assembly 160b through the initial reduction and then the linear reduction, the BCU 150 provides more balanced braking forces across the landing gears 110 and 130 and decreases the yaw effect due to releasing the brake pressure on brake assembly 160c.

In various embodiments, during the predetermined time period, the BCU 150 determines whether the front wheel assembly 314fi has recovered to a predetermined speed threshold. In various embodiments, if during the predetermined time period the front wheel assembly 314fi has recovered to the predetermined speed threshold, then the BCU 150 returns the brake pressures to both the brake assembly 160c and the brake assembly 160b at the pressure being commanded by the brake pedal. In various embodiments, if during the predetermined time period the front wheel assembly 314b fails to recover to the predetermined speed threshold, then the BCU 150 leaves the brake pressure to the brake assembly 160c at zero PSI and returns the brake pressure to the brake assembly 160b at the pressure being commanded by the brake pedal.

Figure 5A:
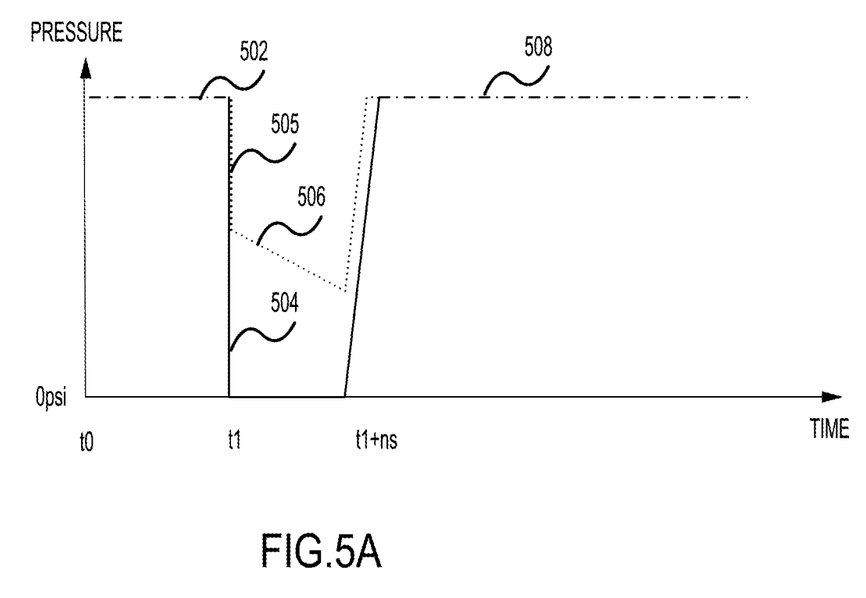
FIGS. 5A and 5B illustrate charts of brake pressure versus time for an aircraft, according to various embodiments.
Figure 5B:
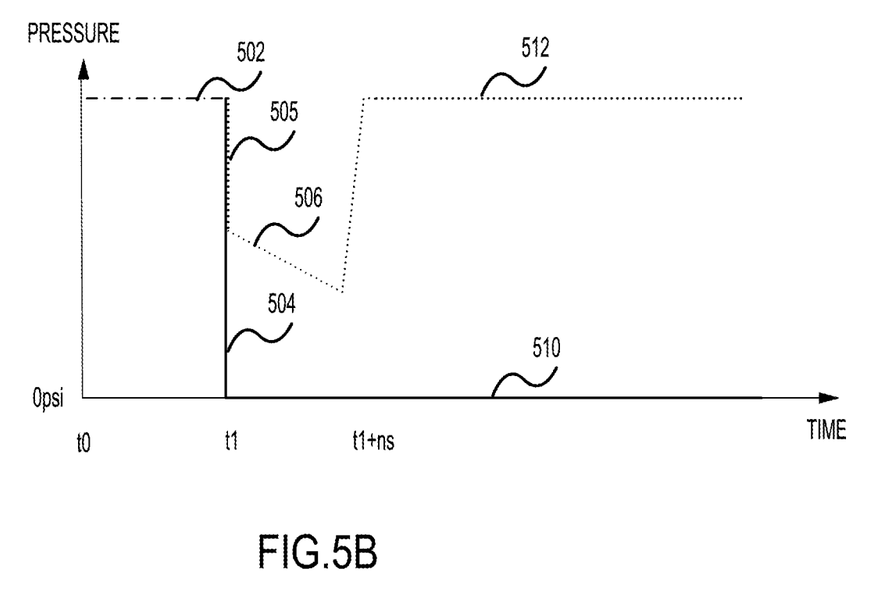

Turning now to FIGS. 5A and 5B, in accordance with various embodiments, charts of brake pressure versus time for an aircraft are illustrated. In various embodiments, brake pressure is applied, as commanded by the brake pedal, at time t0 to, for example, the brake assemblies 160c and 160b associated with as set of paired front wheel assemblies 314fi and 312fi of FIG. 4 as indicated by dashed/dotted line 502. At time t1, in response to wheel speed transducer 402c detecting a wheel speed of substantially zero for front wheel assembly 314fi, the BCU 150, upon receiving the indication from the wheel speed transducer 402c, immediately releases the brake pressure, i.e., drops the brake pressure to zero pounds per square inch (PSI), to brake assembly 160c, as indicated by solid line 504. At the same time t1, the BCU 150 initially reduces the brake pressure to the other of the paired wheels, i.e., brake assembly 160b of front wheel assembly 312fi by an initial pressure percentage that is tunable, as indicated by dotted line 505. In various embodiments, the brake pressure may initially be reduced by 40 to 60% of a brake pressure being commanded by a brake pedal of the vehicle. More particularly, the brake pressure may initially be reduced by 45 to 55% of a brake pressure being commanded by a brake pedal of the vehicle. Preferably, the brake pressure may initially be reduced by 50% of a brake pressure being commanded by a brake pedal of the vehicle.

In various embodiments, in response to the initial reduction in applied brake pressure at time t1 to brake assembly 160b, the brake pressure to brake assembly 160b is further reduced linearly at a predetermined percentage of a brake pressure being commanded by a brake pedal of the vehicle for a predetermined time period, i.e., t1 plus n seconds (t1+ns), as indicated by dotted line 506. In various embodiments, the predetermined time period may be from 1 to 6 seconds. More particularly, in various embodiments, the predetermined time period may be from 3 to 5 seconds. Preferably, in various embodiments, the predetermined time period is 4 seconds. By reducing the applied brake pressure to brake assembly 160b through the initial reduction and then the linear reduction, the BCU 150 provides more balanced braking forces across the landing gears 110 and 130 and decreases the yaw effect due to reducing the brake pressure on brake assembly 160c to zero PSI.

In various embodiments, during the predetermined time period, the BCU 150 determines whether the front wheel assembly 314fi has recovered to a predetermined speed threshold. In various embodiments, if during the predetermined time period, i.e., before time t1+ns, the front wheel assembly 314fi has recovered to the predetermined speed threshold, then the brake pressures are returned at the pressure being commanded by the brake pedal to both the brake assembly 160c and the brake assembly 160b, as indicated by dashed/dotted line 508 in FIG. 5A. In various embodiments, if during the predetermined time period the front wheel assembly 314b fails to recover to the predetermined speed threshold, i.e. after time t1+ns, then the brake pressure to the brake assembly 160c is left at zero PSI, as indicated by solid line 510 in FIG. 5B, and the brake pressure to the brake assembly 160b resumes normally, as indicated by dotted line 512 in FIG. 5B. It is noted that, during the time from t1 to time t1+ns, the BCU 150 may issue an ARINC message to a device in the cockpit for viewing by the pilot to indicate that braking is degraded and the BCU 150 is attempting to compensate for induced yaw.

Figure 6:
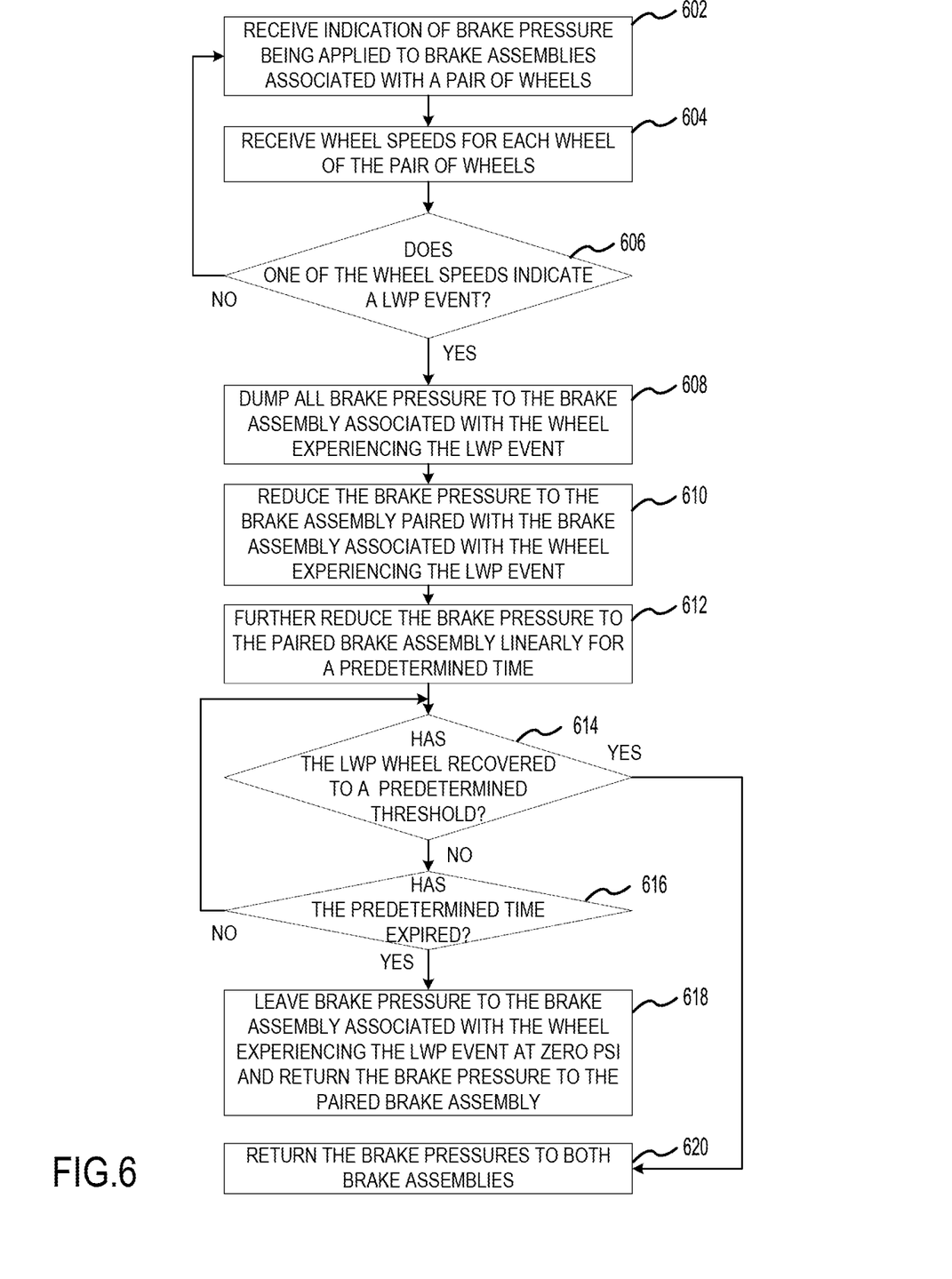
FIG. 6 illustrates a method for aircraft brake control, according to various embodiments.

Referring now to FIG. 6, in accordance with various embodiments, a method 600 for aircraft brake control is illustrated. Method 600 may be performed by processor within a brake control unit (BCU), such as 150 of FIG. 2. At block 602, the processor receives an indication of brake pressure being applied to brake assemblies associated with a pair of wheels. At block 604, the processor receives wheel speeds for each wheel of the pair of wheels. At block 606, the processor determines whether one of the wheel speeds indicate a locked wheel protection (LWP) event. For example, a LWP event may be indicated by a detected wheel speed being substantially equal to zero. If at block 606 the processor fails to determine a LWP event, then the operation returns to block 602. If at block 606, the processor identifies an LWP event, then, at block 608, the processor releases all brake pressure to the brake assembly associated with the wheel experiencing the LWP event. At block 610, the processor reduces the brake pressure to the brake assembly paired with the brake assembly associated with the wheel experiencing the LWP event by a predetermined amount.

At block 612, the processor further reduces the brake pressure to the paired brake assembly linearly at a predetermined percentage of a brake pressure being commanded by a brake pedal of the vehicle for a predetermined time. At block 614, the processor determines whether the wheel experiencing the LWP event has recovered to a predetermined speed threshold. If at block 614 the processor determines that the wheel experiencing the LWP event has not recovered to the predetermined speed threshold, then at block 616, the processor determines whether the predetermined time period has expired. If at block 616 the processor determines that the predetermined time period has not expired, then operation returns to block 614. If at block 616 the processor determines that the predetermined time period has expired, then, at block 618, the processor leaves the brake pressure to the brake assembly associated with the wheel experiencing the LWP event at zero PSI and returns the brake pressure to the paired brake assembly at the pressure being commanded by the brake pedal. If at block 614 the processor determines that the wheel experiencing the LWP event has recovered to the predetermined speed threshold, then, at block 620, the processor returns the brake pressures to both brake assemblies at the pressure being commanded by the brake pedal.

Accordingly, an improved LWP functionality is provided that includes better stability control of the aircraft during landing. The induced yaw caused by the LWP function is minimized by pairing adequately the symmetric wheels and providing feedback to the cockpit to inform the pilot of the situation.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for controlling brake assemblies of a vehicle, the method comprising:
    responsive to identifying a locked wheel protection event for a first wheel of a paired set of wheels on the vehicle, wherein the paired set of wheels is the first wheel on one side of the vehicle and a second wheel on an opposite side of the vehicle:
        reducing a first brake pressure to a first brake assembly associated with the first wheel to zero pounds per square inch (PSI); and
        reducing a second brake pressure to a second brake assembly associated with the second wheel of the paired set of wheels by a predetermined amount in order to reduce a yaw effect to the vehicle;
    determining whether the first wheel has recovered from the locked wheel protection event; and
    responsive to the first wheel recovering from the locked wheel protection event, returning the first brake pressure and the second brake pressure to a braking pressure being commanded by a brake pedal of the vehicle.

2. The method of claim 1, wherein the predetermined amount is from 40% to 60% of a brake pressure being commanded by a brake pedal of the vehicle.

3. The method of claim 1, further comprising:
    further reducing the second brake pressure to the second brake assembly associated with the second wheel linearly over a predetermined time period.

4. The method of claim 3, wherein the predetermined time period is from 1 to 6 seconds.

5. The method of claim 1, wherein the determining of whether the first wheel has recovered from the locked wheel protection event occurs over a predetermined time period.

6. The method of claim 5, further comprising:
    responsive to the predetermined time period expiring and the first wheel failing to recover from the locked wheel protection event, leaving the first brake pressure at zero PSI and returning the second brake pressure to the braking pressure being commanded by the brake pedal of the vehicle.

7. The method of claim 1, wherein the locked wheel protection event is indicated by a wheel speed transducer indicating a reduced wheel speed.

8. A braking system for controlling brake assemblies of a vehicle, the braking system comprising:
    a brake control unit, wherein the brake control unit is configured to:
        responsive to identifying a locked wheel protection event for a first wheel of a paired set of wheels on the vehicle, wherein the paired set of wheels is the first wheel on one side of the vehicle and a second wheel on an opposite side of the vehicle:
            reduce a first brake pressure to a first brake assembly associated with the first wheel to zero pounds per square inch (PSI); and
            reduce a second brake pressure to a second brake assembly associated with the second wheel of the paired set of wheels by a predetermined amount in order to reduce a yaw effect to the vehicle;
        determine whether the first wheel has recovered from the locked wheel protection event; and
        responsive to the first wheel recovering from the locked wheel protection event, return the first brake pressure and the second brake pressure to a braking pressure being commanded by a brake pedal of the vehicle.

9. The braking system of claim 8, wherein the predetermined amount is from 40% to 60% of a brake pressure being commanded by a brake pedal of the vehicle.

10. The braking system of claim 8, wherein the brake control unit is further configured to:
    further reduce the second brake pressure to the second brake assembly associated with the second wheel linearly over a predetermined time period.

11. The braking system of claim 10, wherein the predetermined time period is from 1 to 6 seconds.

12. The braking system of claim 8, wherein the determining of whether the first wheel has recovered from the locked wheel protection event occurs over a predetermined time period.

13. The braking system of claim 12, wherein the brake control unit is further configured to:
    responsive to the predetermined time period expiring and the first wheel failing to recover from the locked wheel protection event, leave the first brake pressure at zero PSI and return the second brake pressure to the braking pressure being commanded by the brake pedal of the vehicle.

14. The braking system of claim 8, wherein the locked wheel protection event is indicated by a wheel speed transducer indicating a reduced wheel speed.

15. An aircraft, the aircraft comprising:
    a first wheel and a second wheel;
    a first brake assembly associated with the first wheel;
    a second brake assembly associated with the second wheel; and
    a brake control unit, wherein the brake control unit is configured to:
        responsive to identifying a locked wheel protection event for the first wheel:
            reduce a first brake pressure to the first brake assembly to zero pounds per square inch (PSI); and
            reduce a second brake pressure to the second brake assembly by a predetermined amount in order to reduce a yaw effect to the aircraft;
        determine whether the first wheel has recovered from the locked wheel protection event; and
        responsive to the first wheel recovering from the locked wheel protection event, return the first brake pressure and the second brake pressure to a braking pressure being commanded by a brake pedal of the aircraft.

16. The aircraft of claim 15, wherein the brake control unit is further configured to:
    further reduce the second brake pressure to the second brake assembly associated with the second wheel linearly over a predetermined time period.

17. The aircraft of claim 16, wherein the determining of whether the first wheel has recovered from the locked wheel protection event occurs over the predetermined time period.

18. The aircraft of claim 17, wherein the brake control unit is further configured to:
   responsive to the predetermined time period expiring and the first wheel failing to recover from the locked wheel protection event, leave the first brake pressure at zero PSI and return the second brake pressure to the braking pressure being commanded by the brake pedal of the aircraft.

\* \* \* \* \*